United States Patent Office 2,732,667
Patented Jan. 31, 1956

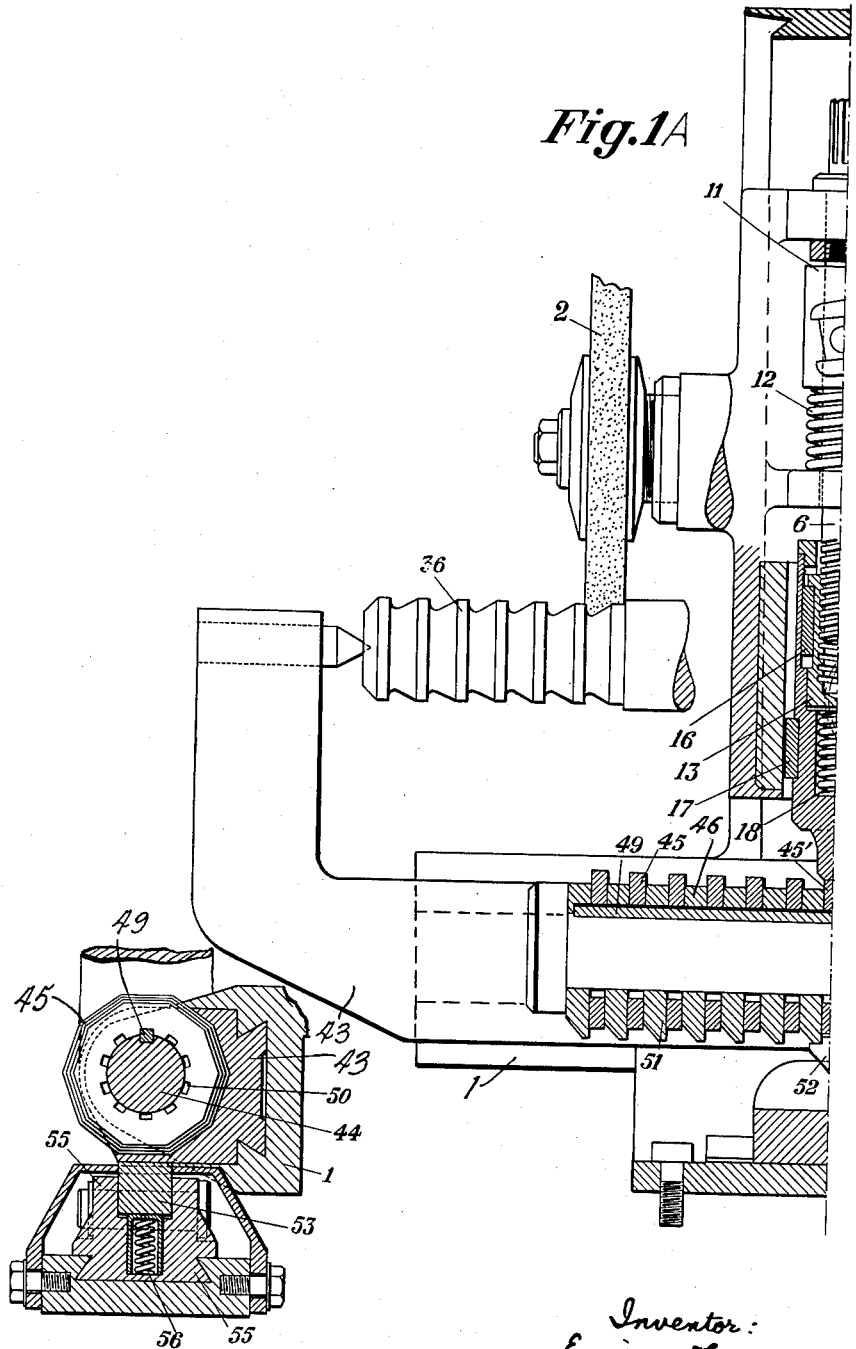

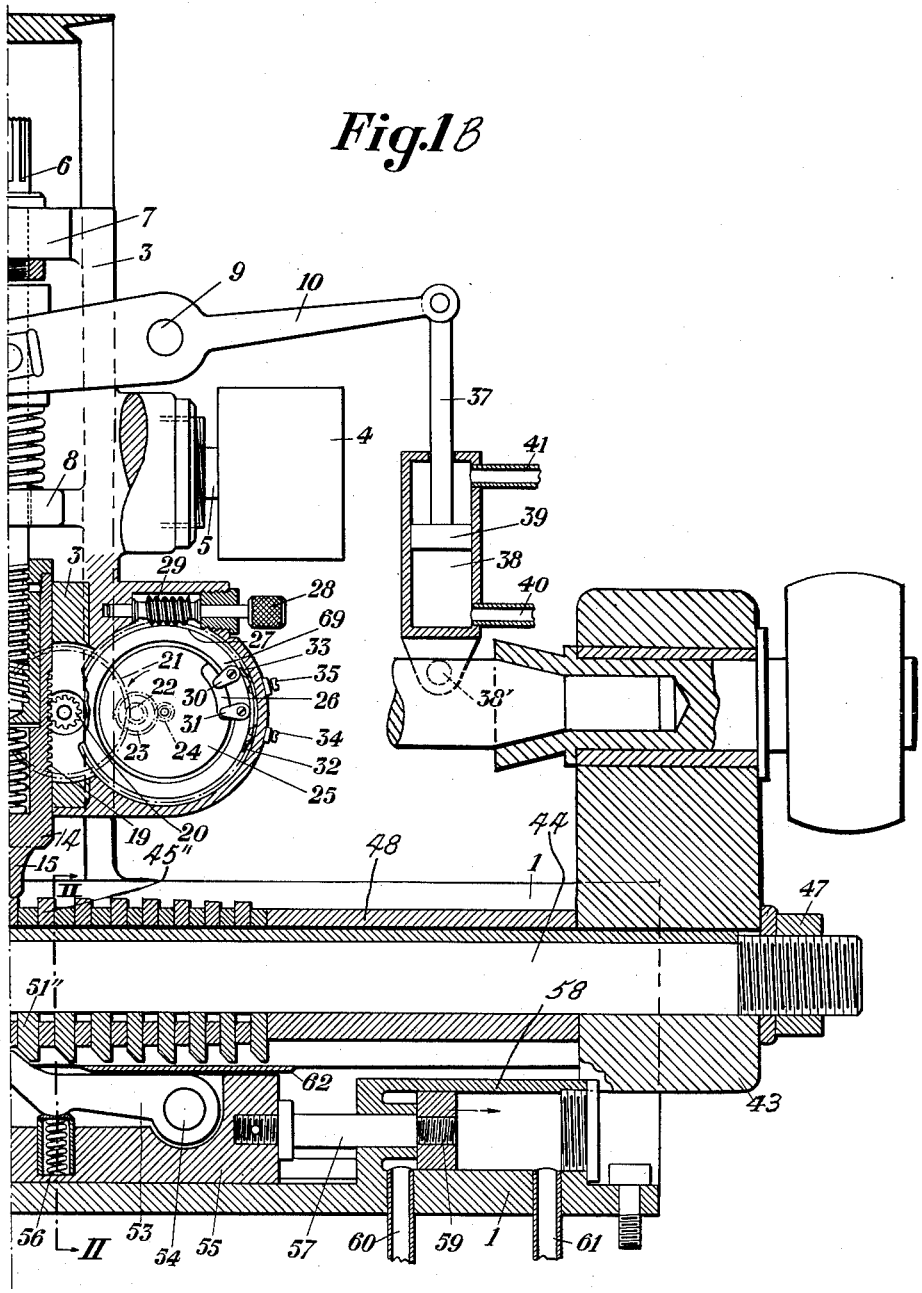

2,732,667

APPARATUS FOR CUTTING BROACHES BY GRINDING

Eugène Fouquet, Bois-Colombes, France

Application September 11, 1951, Serial No. 246,001

Claims priority, application Sweden September 25, 1950

7 Claims. (Cl. 51—100)

The present invention is concerned with an apparatus for cutting broaches, or analogous tools, by grinding. In such apparatus it is highly important that the edges made on the periphery of the broach be disposed correctly in respect to one another and that their distance, often varying, as well as their height be exact, in order that the broach may operate with the greatest possible accuracy.

This, according to the invention, is rendered possible by combining a grinder frame, movable perpendicularly to the broach blank, generally ground conical, with a pattern constituted by lamina parts and spacing wedges, the height of these lamina parts corresponding to the diameter of the broach edges, whereas the spacing wedges correspond to the width of the grooves that separate these edges.

According to one feature of the present invention the lamina members and the spacing wedges may be slipped and gripped on an axle that may be secured onto a carriage which is slidable on the grinder frame and on which may also be mounted the broach set in rotation by means of a motor. To allow of large variations the lamina members may be constituted by thin plates having several peripheral sides, for example ten in number, pierced each with a central hole, the radial distances of the sides from the center of the hole being different. By turning each plate into a predetermined position it is possible to obtain with the same lamina members, a profile varying within certain limits for the diameter of the broach edges, as will be explained in detail hereinafter. The spacing wedges also may be given different thicknesses in order to obtain, between the edges, widths of grooves decreasing with the decrease in diameter of these edges.

Further features of the present invention will be apparent from the following description and appended claims.

The invention will be described with reference to the accompanying schematic drawings wherein a longitudinal view of a form of apparatus embodying the invention is shown as being split into Figs. 1A and 1B to comply with the usual paper size, and wherein Fig. 2 is a section along the line II—II of Fig. 1B.

Shown by 1 is the framework on which is mounted the support 3 which may be displaced in height along a dovetail forming part of the framework and carries the grinder 2. The grinder 2 is mounted on a shaft 5 rotatable in the support 3 and driven by a pulley 4. Mounted in the support 3 is a shaft 6 rotatable but not displaceable longitudinally. This shaft is rotatable in the sleeves 7, 8 and is connected, between these two sleeves, with a forked lever 10 which may oscillate about an axle 9 carried by the frame 1 of the machine, and which is controlled by a sleeve 11 displaceable along the shaft 6. Between the sleeve 11 and the sleeve 8 is placed a coil spring 12.

The lowermost portion of shaft 6 is screwed into a regulating bush 13 slidable but not rotatable in an abutment 14 ended at its base by a follower 15. The regulating bush 13 is displaceable in the abutment 14 and guided therein by a key 16; in its turn the abutment 14 is slidable but not rotatable in the movable support 3 of the grinder, and is guided therein by a key 17. Between the lower end of regulating bush 13 and the bottom of a housing in the abutment 14 is placed a coil spring 18.

Along one of its faces the abutment 14 is provided with a rack 19 in mesh with a pinion 20 mounted on the grinder frame 3; this pinion, through a gear 21 keyed to the same axle, transmits the motion to a pinion 22 which, through a gear 23, acts upon the pinion 24. The latter is rigid with a disc 25, of insulating material, onto which is secured a contact piece 26. Around the disc 25, and on the same axle as the pinion 24, a helical gear wheel 27 is mounted loose and is in mesh with a worm 29 carried by the grinder support 3 and which may be maneuvered by means of a milled head 28.

Secured to the gear wheel 27 is a disc 69, of insulating material, carrying two elastic contacts 30, 31 connected with two contact rings (not shown) arranged on the periphery of the disc 69 and against which rub the elastic contacts 32, 33 connected to the terminals 34, 35. By turning the worm 29 it is possible to modify the angular position of the contacts 30, 31.

The broach 36 to be cut is mounted on opposite supports extending from a carriage 43 displaceable parallelly to the grinder axis, and the broach 36 may be rotated in a well-known manner by a pulley as shown in Fig. 1B. The forked lever 10, engaged onto the sleeve 11, has its opposite end pivotally connected to the rod 37 of a piston 39 displaceable in a hydraulic cylinder 38 that may oscillate about an axle 38'. This cylinder is provided with fittings 40, 41 through which a liquid under pressure may be fed against one or the other face of the piston 39.

The aforesaid follower 15 is intended, according to the invention, to act in combination with the pattern which is composed of a certain number of lamina parts 45 and spacing wedges 46, slipped over an axle 44 secured onto a carriage 43 slidably mounted on the machine frame 1. The laminae and the spacing wedges are held together on the axle, in the desired orientation, by a key 49 which is inserted into this axle and to which correspond the notches 50 (Fig. 2) on the central hole in the laminae and the spacing wedges. The laminae and the spacing wedges are held together on the axle 44 in the longitudinal sense by means of a tightening nut 47 acting upon the threaded end of this axle which is engaged into the carriage 43. If the laminae and the spacing wedges do not fill the axle 44 completely, a distance sleeve 48 may be employed (Fig. 1).

The laminae 45 may be in the shape of polygonal discs in which the distance between the various sides and the center of the hole in 44 may vary, the variation being for example 1/10 mm. If, as is seen in the drawing, each lamina member 45 is provided opposite each side with a notch 50 for the key, it will be possible to place the laminae in ten different positions in respect to the follower 15. Owing to this and to the fact that the various laminae have different dimensions, it is clear that it will be possible to combine, with the same laminae, the pattern for dimensions varying within certain limits, in order to correspond to those desired to be obtained on the broach.

The spacing wedges 46, which do not have to be oriented differently on the axle 44, have their lower portions provided with projections 51 exceeding the laminae 45 and turned downwardly; the projections are intended to act in combination with a pawl-like end 52 of the lever 53 which may turn about the axle 54 secured to the sliding block 55 displaceable on the dead frame 1 of the machine. The lever 53 is subjected to the action of a spring 56 by which this lever 53 may be raised to apply the pawl 52 against the projections 51 of the spacing wedges 46 sticking out downwardly. The sliding block 55 is connected by a rod 57 to the piston 59 displaceable in a cylinder 58. At its two ends the cylinder is provided with fittings 60, 61 through which a liquid under pressure may be fed thereinto. A stationary guiding tongue 62 is placed above the sliding block 55 and the lever 53 with its pawl 52.

The operation of the apparatus is as follows:

The positions of the various parts shown in Figs. 1A and 1B are those they occupy when the grinder 2 has just finished cutting a groove on the broach. As is seen, the abutment 14 is slightly moved up by the pressure of the follower 15 on the laminae 45′ in respect to the movable support 3 of the grinder, as well as in respect to the regulating bush 13, while compressing the spring 18. Because of this move, the rack 19 on the abutment 14 rotates clockwise the pinion 20 and hence the disc 25 with the contact piece 26, in such a way that an electric circuit is made between the terminals 34 and 35. Into this circuit is branched a servomotor of any convenient type, for example of solenoid type, not shown, adapted to control a valve (not shown) mounted on the hydraulic cylinder 38 in such a way that a liquid under pressure is fed thereinto through the fitting 41.

The piston 39 is thus pushed downwards and raises, through the lever 10, the support of the grinder 2 in such a way that the latter moves away from the broach 36 at the same time as the abutment 14 moves a trifle downwards merely under the action of the spring 18, so that the pinion 20 now rotates counterclockwise and that the disc 25 with the contact piece 26 rotates likewise while cutting off the contact with the elastic contacts, or at least with the one of the latter, whereafter the abutment 14 accompanies the grinder support in its upward motion and consequently the follower 15 moves away from the lamina $45^{11}$.

At this moment an electric circuit is made, for example by means of a contact (not shown) operated by the piston rod 37; the current operates a valve device that directs the liquid under pressure into the hydraulic cylinder 58 through the fitting 60. It results therefrom that the lever 53 with its pawl 52 returns backwards. At the end of this return occurs, likewise electrically, a reversal in the valve device of cylinder 58, so that the liquid under pressure is fed into this cylinder through the fitting 61, whereby the lever 53—52 moves forward driving along the projection $51^{11}$ of spacing wedge 46, so that the whole pattern, together with its carriage 43, moves to the left throughout a corresponding length.

The carriage 43 also moves, throughout the same length, to the left. Then, an electric contact (not shown), operated by one of these carriages, is made up whereby the flow of the liquid under pressure is cut off on the fitting 41 and is directed into the fitting 40. Owing to the upward motion of the piston 39, which then takes place, the grinder support 3 moves again downwards, so that the grinder 2 comes in contact with the broach 36.

At first, the follower 15 is not in contact with the lamina $45^{11}$ which is now in position. It is only when the grinder 2 has hollowed out the major portion of the groove on the broach 36 and when the grinder support 3, whose downward motion is effected under the action of the spring 12 compressed by the lever 10, has moved sufficiently downwards, that the follower 15 comes in contact with the lamina $45^{11}$. At this moment, a relative upward motion of the abutment 14 in respect to the regulating bush 13 is produced by the compression of the spring 18. The pinion 20 then rotates again clockwise and, owing to the high ratio of gears interconnecting the pinion 20 and the disc 32, an insignificant upward move of the abutment 14 is sufficient to actuate the piston 39 in the manner already described and to raise the grinder 2 above the broach 36.

It is clear that with the apparatus hereinabove described it is possible to shape a broach, such as 36, with great accuracy and that with a pattern constituted by laminae, such as 45, and spacing wedges, such as 46, it is possible to determine, in a particularly simple way, the desired form of the broach. In this respect, many variations can be effected by employing polygonal laminae with their peripheral sides disposed at different distances from their centers.

Also, rotation of the shaft 6 permits of regulating the cutting depth of the grinder since the regulating bush 13 and consequently the abutment 14, with its follower 15, may be raised or lowered in respect to the grinder support 3.

As already stated, an additional regulation or adjustment may be effected with the aid of the worm-gear 29.

What is claimed is:

1. In a broach-making machine, a master broach pattern for guiding a grinding wheel so that the latter forms a broach according to the shape of the master pattern, the latter comprising, in combination, an elongated shaft; a plurality of discs, corresponding to broach teeth, each formed with a central opening passing therethrough and having said shaft located therein, said discs being spaced from each other along said shaft and extending transversely thereto, and said discs being adapted to engage, on one side of said shaft, a member for changing the position of a grinding wheel; and a plurality of spacer members each formed with an opening passing therethrough and having said shaft located therein, said spacer members being respectively located against said plurality of discs and being arranged alternately with the same along said shaft to maintain said discs spaced from each other, and said spacer members having on said one side of said shaft edge portions located nearer to said shaft than the edge portions of said discs at said one side of said shaft to provide spaces between said discs at said one side of said shaft, said spacer members respectively having projections extending beyond said discs and located along a straight line parallel to said shaft and on the opposite side thereof from said one side, said projections being adapted to engage a control member for moving a broach blank after a broach tooth has been ground thereon.

2. In a broach-making machine, in combination, a master broach pattern for guiding a grinding wheel so that the latter forms a broach according to the shape of the master pattern, the latter comprising, in combination, an elongated shaft; a plurality of discs, corresponding to broach teeth, each formed with a central opening passing therethrough and having said shaft located therein, said discs being spaced from each other along said shaft and extending transversely thereto, and said discs being adapted to engage, on one side of said shaft, a member for changing the position of a grinding wheel; a plurality of spacer members each formed with an opening passing therethrough and having said shaft located therein, said spacer members being respectively located against said plurality of discs and being arranged alternately with the same along said shaft to maintain said discs spaced from each other, and said spacer members having on said one side of said shaft edge portions located nearer to said shaft than the edge portions of said discs at said one side of said shaft to provide spaces between said discs at said one side of said shaft, said spacer members respectively having projections extending beyond said discs and located along a straight line parallel to said shaft and on the opposite side thereof from said one side, said projections being adapted to engage a control member for moving a broach blank after a broach tooth has been ground thereon; and removable clamping means mounted on said shaft for removably clamping said discs and spacer members to each other; and means on the machine for supporting a work piece in parallel relation to said pattern.

3. A master broach pattern for guiding a grinding wheel so that the latter forms a broach according to the shape of the master pattern, the latter comprising, in combination, an elongated shaft; a plurality of discs, corresponding to broach teeth, each formed with a central opening passing therethrough and having said shaft located therein, said discs being spaced from each other along said shaft and extending transversely thereto, and said disc being adapted to engage, on one side of said shaft, a member for changing the position of a grinding wheel, said discs each being polygonal; and a plurality of spacer members each formed with an opening passing therethrough and having said shaft located therein, said spacer members being respectively located against said plurality of discs and being arranged alternatively with the same along said shaft to maintain said discs spaced from each other, and said spacer members having on said one side of said shaft edge portions located nearer to said shaft than the edge portions of said discs at said one side of said shaft to provide spaces between said discs at said one side of said shaft, said spacer members respectively having projections extending beyond said discs and located along a straight line parallel to said shaft and on the opposite side thereof from said one side, said projections being adapted to engage a control member for moving a broach blank after a broach tooth has been ground thereon.

4. A master broach pattern for guiding a grinding wheel so that the latter forms a broach according to the shape of the master pattern, the latter comprising, in combination, an elongated shaft; a plurality of discs corresponding to broach teeth, each formed with a central opening passing therethrough and having said shaft located therein, said discs being spaced from each other along said shaft and extending transversely thereto, and said discs being adapted to engage, on one side of said shaft, a member for changing the position of a grinding wheel, said discs each being polygonal and formed with a plurality of keyways corresponding in number to the sides of said disc and located opposite the same; a key fixed to said shaft and being located in one of said keyways of each disc; and a plurality of spacer members each formed with an opening passing therethrough and having said shaft located therein, each spacer member being formed with a keyway in which said key is located and said spacer members being respectively located against said plurality of discs and being arranged alternately with the same along said shaft to maintain said discs spaced from each other, and said spacer members having on said one side of said shaft edge portions located nearer to said shaft than the edge portions of said discs at said one side of said shaft to provide spaces between said discs at said one side of said shaft, said spacer members respectively having projections extending beyond said discs and located along a straight line parallel to said shaft and on the opposite side thereof from said one side, said projections being adapted to engage a control member for moving a broach blank after a broach tooth has been ground thereon.

5. A master broach pattern for guiding a grinding wheel so that the latter forms a broach according to the shape of the master pattern, the latter comprising, in combination, an elongated shaft; a plurality of discs corresponding to broach teeth, each formed with a central opening passing therethrough and having said shaft located therein, said discs being spaced from each other along said shaft and extending transversely thereto, and said discs being adapted to engage, on one side of said shaft, a member for changing the position of a grinding wheel, said discs each being polygonal and formed with a plurality of keyways corresponding in number to the sides of said disc and located opposite the same; a key fixed to said shaft and being located in one of said keyways of each disc; a plurality of spacer members each formed with an opening passing therethrough and having said shaft located therein, each spacer member being formed with a keyway in which said key is located and said spacer members being respectively located against said plurality of discs and being arranged alternately with the same along said shaft to maintain said discs spaced from each other, and said spacer members having on said one side of said shaft edge portions located nearer to said shaft than the edge portions of said discs at said one side of said shaft to provide spaces between said discs at said one side of said shaft, said spacer members respectively having projections extending beyond said discs and located along a straight line parallel to said shaft and on the opposite side thereof from said one side, said projections being adapted to engage a control member for moving a broach blank after a broach tooth has been ground thereon; and removable clamping means mounted on said shaft for removably clamping said discs and spacer members to each other.

6. A disc for a master broach pattern, said disc being made of a substantially rigid material, being formed with a substantially central opening passing therethrough, and said disc having a plurality of straight sides extending about the periphery thereof and forming a polygon, said straight sides respectively being located at different distances from said opening of said discs and said disc being formed with a plurality of keyways communicating with said central opening and being respectively located opposite said sides.

7. A master broach pattern for guiding a grinding wheel so that the latter forms a broach according to the shape of the master pattern, the latter comprising, in combination, an elongated shaft; a plurality of discs corresponding to broach teeth, each formed with a substantially central opening passing therethrough and having said shaft located therein, said discs being spaced from each other along said shaft and extending transversely thereto, and each of said discs having a plurality of straight sides forming a polygon and respectively located at different distances from said opening of said disc, said discs being arranged with one of said straight sides thereof located at one side of said shaft, and said one straight side of each disc being parallel to said one straight side of the next disc, said discs being turnable on said shaft with respect to each other for changing the configuration of the pattern; a plurality of spacer members each formed with an opening passing therethrough and having said shaft located therein, said spacer members being respectively located against said plurality of discs and being arranged alternately with the same along said shaft to maintain said discs spaced from each other, and said spacer members having on said one side of said shaft edge portions located nearer to said shaft than said one straight sides of said discs to provide spaces between said one straight sides of said discs, said spacer members respectively having projections extending beyond said discs and located along a straight line parallel to said shaft on the opposite side thereof from said one side, said projections being adapted to engage a control member for moving a broach blank after a broach tooth has been ground thereon; and means engaging said shaft, discs and spacer members for preventing relative rotation between said shaft, discs and spacer members.

References Cited in the file of this patent

UNITED STATES PATENTS

| Number | Name | Date |
|---|---|---|
| 988,154 | Thiemer | Mar. 28, 1911 |
| 1,017,879 | Landis | Feb. 20, 1912 |
| 1,197,132 | Lapointe | Sept. 5, 1916 |
| 1,444,598 | Ferguson et al. | Feb. 6, 1923 |
| 1,783,755 | Trefethen et al. | Dec. 2, 1930 |
| 1,882,098 | Silven | Oct. 11, 1932 |
| 1,984,936 | Larsson | Dec. 18, 1934 |
| 2,010,375 | Plimmer | Aug. 6, 1935 |
| 2,120,096 | Hausman | June 7, 1938 |
| 2,317,616 | Jones | Apr. 27, 1943 |
| 2,416,124 | Siemen | Feb. 18, 1947 |